(12) United States Patent
Naumann et al.

(10) Patent No.: US 10,819,089 B2
(45) Date of Patent: Oct. 27, 2020

(54) HEATED ELECTRICAL DISTRIBUTION SYSTEM

(71) Applicant: Eaton Intelligent Power Limited, Dublin (IE)

(72) Inventors: Reiner Naumann, Mannheim (DE); Marco Knab, Eberbach (DE); Toni Christian Ott, Neckargemund (DE); Patrick Muhlfeld, Rothenberg-Finkenbach (DE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/345,308

(22) PCT Filed: Jul. 21, 2017

(86) PCT No.: PCT/EP2017/068481
§ 371 (c)(1),
(2) Date: May 10, 2019

(87) PCT Pub. No.: WO2018/077494
PCT Pub. Date: May 3, 2018

(65) Prior Publication Data
US 2019/0305528 A1    Oct. 3, 2019

(30) Foreign Application Priority Data
Oct. 26, 2016   (DE) .................. 10 2016 221 041

(51) Int. Cl.
*H02B 1/56*     (2006.01)
*H02B 1/052*    (2006.01)
(Continued)

(52) U.S. Cl.
CPC ............ *H02B 1/56* (2013.01); *H02B 1/052* (2013.01); *H02B 1/205* (2013.01); *H05B 3/0019* (2013.01)

(58) Field of Classification Search
CPC .... F24H 9/1872; F24H 3/0435; F24H 3/0405; F24H 1/121; F24H 3/082; F24H 9/1863;
(Continued)

(56) References Cited

U.S. PATENT DOCUMENTS 2,542,853 A * 2/1951 Wills ................. H02B 1/21
                                                          361/608
3,633,075 A * 1/1972 Hawkins ............. H01H 9/10
                                                          361/616
(Continued)

FOREIGN PATENT DOCUMENTS

| DE | 102014104857 A1 * | 10/2015 | ......... H05K 7/20145 |
| DE | 102014104857 A1 | 10/2015 | |
| EP | 1047168 A1 | 10/2000 | |

OTHER PUBLICATIONS

English translation of Eggs DE reference (Year: 2010).*
International Search Report for PCT/EP2017/068481, dated Oct. 11, 2017, 4 pages, The Netherlands.

*Primary Examiner* — Mandeep S Buttar
(74) *Attorney, Agent, or Firm* — Stinson LLP

(57) ABSTRACT

The invention relates to an electrical distribution system (1), having a housing (3), in which fastening rails (13) are provided, which provide fastening points (15), which are arranged in lines, for the fastening of electrical components (17). Additionally, one or more, in particular explosion-protected, line-shaped heating elements (19) are provided in the housing (3), which heating elements each comprise a radiator body (23). The one or more heating elements (19) are each arranged below an associated group of fastening points (15), where electric current can be applied to the
(Continued)

heating elements in order to heat electrical components (17) fastened at the associated fastening points (15).

19 Claims, 4 Drawing Sheets

(51) Int. Cl.
*H02B 1/20* (2006.01)
*H05B 3/00* (2006.01)

(58) Field of Classification Search
CPC ..... F24H 9/2071; F24H 3/12; H05B 2203/02; H05B 3/50; H05B 3/06; H05B 3/24; H05B 3/26; H05B 1/02; H05B 3/44; B60H 1/2225; B60H 1/2215; B60H 1/2226; H05K 7/20; H05K 2203/1115
USPC ........ 361/624, 735, 729; 219/520, 536, 538, 219/542, 552; 392/391, 407
See application file for complete search history.

(56) References Cited

U.S. PATENT DOCUMENTS

| | | | | |
|---|---|---|---|---|
| 2002/0186965 | A1* | 12/2002 | Zimmer | F23K 5/22 |
| | | | | 392/397 |
| 2007/0109731 | A1* | 5/2007 | Bergmann | H01R 25/16 |
| | | | | 361/624 |
| 2012/0229937 | A1* | 9/2012 | Ramamurthy | H02H 5/047 |
| | | | | 361/18 |

* cited by examiner

HEATED ELECTRICAL DISTRIBUTION SYSTEM

CROSS-REFERENCE TO RELATED APPLICATIONS

This application is a National Stage Entry of, and claims priority to, PCT Patent Application No. PCT/EP2017/068481, filed Jul. 21, 2017, which claims priority to German Patent Application No. 102016221041.6, filed Oct. 26, 2016, both of which are hereby incorporated by reference in their entirety.

FIELD OF THE DISCLOSURE

The present invention relates to the field of electrical distribution systems.

BACKGROUND

Electrical distribution systems are known from practice, for example in the form of switchgear cabinets or connection boxes, which have fastening rails for fastening electrical components in a housing. The fastening rails may, for example, accommodate relays, switches, timer switches, fuses, or other electrical components. Distribution systems known from practice may include electrical busbars by means of which the various circuits can be connected. Typically, the housing includes one or more doors for opening a front side of the housing to access the interior of the distribution system, for example, in order to install and wire the electrical components or to carry out maintenance work.

If an electrical distribution system is installed in very cold environments, for example, at temperatures lower than −25° C., it may happen that the selection of suitable electrical components for low temperatures is significantly reduced.

It is therefore desirable to provide an electrical distribution system which as efficiently as possible enables proper operation of standard electrical components even at low ambient temperatures. To make this possible, recourse is usually had to heating the distribution board. Previous embodiments are realized, for example, by means of a central heating element in the lower region of the distribution board. Another possibility is to lay heating loops of heating tapes. The first option is thermally inefficient; the latter is inefficient partially thermally but above all in terms of costs. The latter solution is in particular not easy to install.

SUMMARY OF THE DISCLOSURE

It is therefore an object of the invention to provide an electrical distribution system with a readily scalable, thermally efficient, and cost-effective heating solution.

This object is achieved by the subject-matter of claim 1. The dependent claims indicate advantageous embodiments of the invention.

An electrical distribution system according to the invention comprises a housing having fastening rails provided therein. The fastening rails provide fastening points, which are arranged in rows, for fastening electrical components. For example, relays, switches, timer switches, fuses, and/or other electrical components can be arranged at the fastening points. Advantageously, the electrical components can be slid laterally onto the fastening rails or plugged on from the front It would also be conceivable for the electrical components to be screwed or glued or otherwise fastened at the fastening points. The fastening rails may have discrete fastening points, which are arranged in rows and at which electrical components may be fastened. However, the fastening rails do not necessarily have to have discrete fastening points. For example, it would be conceivable for electrical components to be fastenable at any position along a fastening rail by laterally sliding them onto the fastening rail or plugging them on from the front so that the fastening rail has non-discrete fastening points arranged continuously along the direction of extension of the fastening rail.

In the housing are provided one or more linear heating elements, which in each case comprise a radiator body. The linear heating elements are each arranged below an associated group of fastening points, where electric current can be applied to the heating elements in order to heat electrical components fastened at the associated fastening points.

The electrical heating elements allow heating of the electrical components so that the latter can also be used below their specified ambient temperature (e.g. at less than −25° C.). Due to the radiator bodies, the heating elements may dissipate heat particularly well to the environment. By virtue of their linear shape, the heating elements can be mounted in a space-saving manner directly below the fastening points, which are arranged in rows, for the electrical components to be heated. Due to the thus achievable closeness between the electrical components to be heated and the heating elements, the electrical components can be heated particularly energy-efficiently.

The heating elements are preferably explosion-protected to also enable their use in explosive environments, such as in the presence of combustible gases, mists, and/or vapors. The heating elements can in particular be encapsulated in a pressure-resistant manner and satisfy the requirements for an Ex-d marking.

It would be conceivable for only a single linear heating element to be provided. This heating element could be arranged in particular below a group of fastening points which are provided for fastening particularly heat-requiring electrical components. Particularly when a larger number of electrical components is to be heated, it may however be advantageous when several units are provided, each comprising a heating element and a group of fastening points associated therewith. For example, a plurality of such units could be arranged one below the other in the housing. Alternatively or additionally, a plurality of units could be arranged horizontally next to each other in the housing. For example, in comparison to a single larger heating element disposed in particular centrally in the housing, a plurality of linear heating elements arranged directly below the electrical elements to be heated has a higher energy efficiency due to their closeness to the corresponding electrical components. In addition, the linear heating elements can be arranged in the housing in a significantly more space-saving manner. The provision of a plurality of linear heating elements also allows a situation-dependent heating of only a portion of the heating elements corresponding to the demand of the moment, which can further increase the energy efficiency of the distribution system.

In order to increase the achievable heating power especially locally, a further linear heating element to which electric current can be applied can be arranged above at least one heating element and below the group of fastening points associated therewith. This can be the case for each group of fastening points or only a portion of the groups of fastening points which requires particularly good heating.

Preferably, the fastening rails are arranged substantially horizontally so that the fastening points are provided along horizontal rows. The heating elements are preferably arranged such that they extend at least substantially horizontally. A particularly high heating output at the individual electrical components can be achieved when the fastening rails and the heating elements are arranged alternatingly in the housing with respect to a vertical direction. An underlying heating element is thus in each case associated with a fastening rail. Depending on the electrical components provided and on the temperature of the environment in which the distribution system is to be used, a different ratio of fastening rails and heating elements may however also be useful. For example, with respect to a vertical direction, several, for example, two, three or more fastening rails could be provided in the housing alternating with a heating element. A common underlying heating element would thus in each case be associated with a plurality of fastening rails. In order to achieve a higher heating output, two or more heating elements can however in each case always be provided with respect to the vertical direction in the housing alternating with one or more, for example two, three or more, fastening rails.

Depending on the dimensions of the fastening rails, it may be useful to arrange a plurality of heating elements one after the other along the extension direction of their row. This may be advantageous in comparison to a single, longer heating element since a higher flexibility exists in the arrangement of the heating elements and electric current can optionally be applied to only a portion of the heating elements in a particular operating mode in order to heat specific electrical components in a targeted manner.

The heating elements may be provided on an inner wall, in particular a rear wall, of the housing. The heating elements can in particular be provided on projections of the inner wall or of the rear wall. The fastening rails can also be provided on the inner wall, in particular on the rear wall, of the housing.

The heating elements may for example, be connected electrically in series and/or in parallel.

The distribution system may include a busbar system having busbars for supplying electric current to the electrical components. By connecting connection points of the electrical components to the busbars, various circuits can be connected quickly and economically.

The busbar system may be provided within the housing. Preferably, the busbar system is provided in the housing below the fastening rails and/or the heating elements. Since heat generated by the heating elements preferably propagates upward, the region, which comprises the busbar system, of the housing can thus be prevented from being heated unnecessarily. Additionally, heat generated by the busbar system can better contribute to heating the arranged electrical components when they are arranged above the busbar system.

A region, which comprises the busbar system, of the housing can be thermally decoupled from a region, which comprises the fastening rails and/or the heating elements, of the housing. This can be achieved, for example, by corresponding partition walls and/or a brush grommet, which still allows cable feedthrough. Such a measure is particularly effective when the busbar system is provided in the housing above the heating elements and/or the fastening rails since the thermal decoupling prevents or reduces unnecessary heating of the region comprising the busbar system. However, even when the busbar system is below the heating elements and/or the fastening rails, it may be expedient to thermally decouple the region, which comprises the busbar system, of the housing from the region, which comprises the fastening rails and/or the heating elements, of the housing.

The distribution system can include terminals for connecting the distribution system to an external power supply for the electrical components. The terminals may be provided, for example, in the housing above the fastening rails and/or above the busbar system. It is also conceivable for the terminals to be provided between a rear wall of the housing and the busbars and/or to be arranged in a plane which extends on a region to region basis between a rear wall of the housing and the busbars and is parallel to the rear wall of the housing. The busbars may stand off from the rear wall of the housing by means of spacers in order to provide space for providing the terminals. An electrically insulating protective element can be provided between the busbar system and the terminals in order to prevent a short circuit.

A main switch can be provided with which the power supply for supplying the electrical components can be switched on and off centrally. The main switch can be provided in a main switch housing preferably provided next to the busbar system.

A temperature-measuring device can be provided in the housing. In order to be able to assess particularly well whether the heating of the electrical components by the heating elements is adequate, the temperature device can be mounted instead of a corresponding electrical component at a fastening point of a fastening rail. It is particularly advantageous if the temperature-measuring device is mounted at the fastening point at which the lowest temperature is expected from time to time during operation of the electrical distribution system. It can thus be detected as early as possible when an activation of the heating elements or an increase in the heating power is necessary.

A switching device may be provided which is designed to automatically interrupt a power supply of the electrical components and/or of the busbar system when a temperature prevailing in the interior space, which comprises the fastening points, of the housing is lower than a predetermined operating temperature. Alternatively or additionally, the switching device can be designed to prevent activation of the power supply of the electrical components and/or the busbar system before the predetermined operating temperature is reached. The switching device can in particular react as a function of a measured value provided by the temperature-measuring device. Switching off a power supply and/or preventing an activation of the power supply at too low temperatures can prevent electrical components from being operated at too low temperatures, which could cause hazardous operating states of or damage to the electrical components or external devices connected to the electrical distribution system.

Advantageously, electric current can be applied to the heating elements for heating the electrical components, while electric current is not being supplied to the electrical components and/or the busbars. This can be achieved, for example, by a power supply being provided for the heating elements that is separate from the power supply for the electrical components. As a result, the electrical components can be preheated before the main supply of the electrical distribution system is activated. It is also conceivable for the heating elements to be supplied electrically by means of an emergency supply so that in the event of an interruption to the main power supply, the electrical distribution system can be ready for use as quickly as possible.

It is advantageously possible to switch between a first operating mode, in which the heating elements are connected in series for the application of electric current, and a second operating mode, in which the heating elements are connected in parallel to one another for the application of electric current. In this way, the heating power generated by the heating elements can easily be adapted to the situation.

Advantageously, at least a portion of the heating elements comprises a separating element for physically separating one or more cables, in particular cables for connecting the electrical components, from the heating element in order to avoid an overheating of the cables. Such a separating element preferably extends along a line extension direction of the corresponding heating element. The separating element of a heating element is preferably thermally decoupled from the radiator body. For example, the separating element may be stood off from the radiator body.

At least some of the separating elements are preferably designed as cable ducts for accommodating one or more cables, in particular cables for connecting the electrical components. Due to the linear form of the heating elements and the achievable spatial proximity between the heating elements and the associated electrical components, supply cables for the electrical components can be laid in a particularly efficient and space-saving manner in the cable ducts. In addition, the cables are protected and tidied in the cable ducts.

The electrical components are preferably fastened to the fastening points in such a way that a distance of at least 0.3 cm, 0.5 cm, 0.7 cm, 1 cm, 1.5 cm or 2 cm is present between adjacent components at least on a region by region basis. Opposing lateral surfaces of two adjacent electrical components can have the aforementioned minimum distance from one another at any point. However, it may suffice if at least partial regions of the opposing surfaces of adjacent electrical components have the aforementioned minimum distance from one another. To this end, the opposing sides of two adjacent electrical components may be recessed on a region to region basis relative to the direction toward the adjacent electrical component. Due to the distance between the adjacent components, air circulation between the components is possible so that air heated by the heating elements can flow particularly well around the electrical components and thus heat them, thereby increasing the heating efficiency.

When the electrical components are fastened to the fastening points, they may each extend along a projection direction from the fastening rail toward a front opening of the housing. A front end of the heating elements with respect to the projection direction can lie behind the connection points of the electrical components with respect to the projection direction. The heating elements then do not project beyond the position of the connection points of the electrical components in the direction toward the front opening of the housing. The connection points for connecting the electrical components electrically can thus be accessed easily even when a heating element is provided directly below the electrical components.

BRIEF DESCRIPTION OF THE DRAWINGS

The invention is explained in more detail below on the basis of exemplary embodiments with reference to the following drawings. These show.

DETAILED DESCRIPTION

Figure 1:
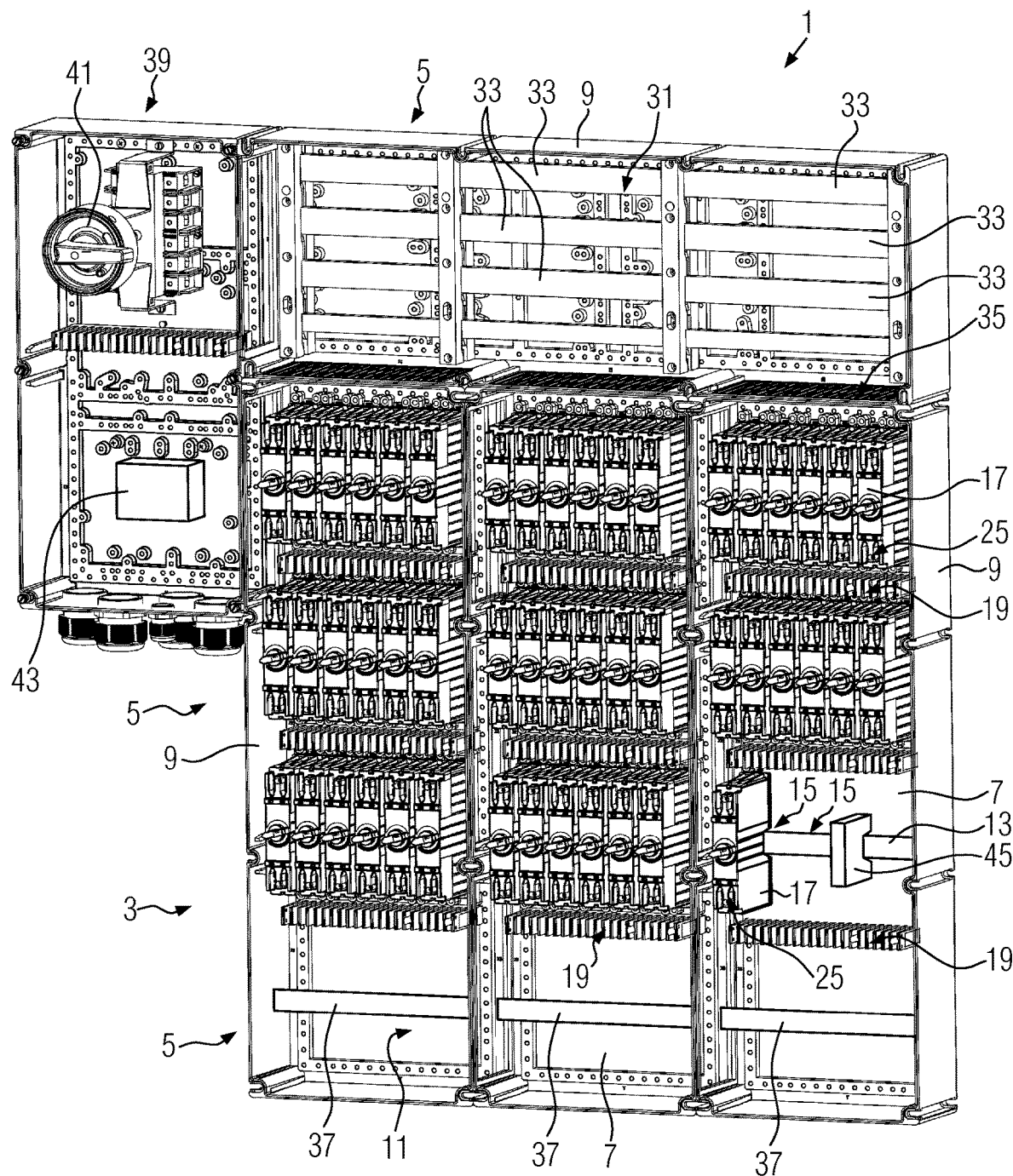
FIG. 1 a schematic representation of an electrical distribution system with electrical components mounted therein, according to one embodiment.

FIG. 1 shows a schematic view of an electrical distribution system 1 according to one embodiment. The distributor system 1 comprises a housing 3 which in the present example is designed in the form of a switchgear cabinet. In the embodiment shown, the housing 3 is modularly composed of a plurality of housing modules 5. This allows the housing 3 to be individually adapted to the desired location. Alternatively, the housing 3 could however also be designed differently, for example, substantially in one piece. The housing 3 comprises a rear wall 7 and side walls 9. The rear wall 7 and the side walls 9 define a front opening 11 of the housing 3, which front opening is directed essentially toward the viewer in FIG. 1. Via the front opening 11, the interior of the housing 3 is accessible for assembly and maintenance purposes. In normal operation of the electrical distribution system 1, the front opening 11 may be closed by means of doors not shown in the figures for the sake of clarity, or otherwise.

Provided in the housing 3 are fastening rails 13, which provide fastening points 15, which are arranged in rows, for fastening electrical components 17. In FIG. 1, fuses are shown as exemplary electrical components 17. However, other electrical components 17 can also be mounted at the fastening points 15, such as relays, switches, timer switches, and/or other components.

In order to also ensure proper operation of the electrical components 17 when the distribution system 1 is used at low ambient temperatures (e.g. less than −25° C.), for which the electrical components 17 are not designed, heating elements 19 are provided in the housing 3. The heating elements 19 are linear and can therefore in each case be arranged in a particularly space-saving manner below an associated group of fastening points 15 for electrical components 17, where electric current can be applied to the heating elements in order to heat electrical components 17 fastened at the associated fastening points 15. Due to their linear form, the heating elements 19 can be arranged in the immediate vicinity of the associated fastening points 15 and can therefore particularly efficiently heat electrical components 17 arranged at the fastening points 15.

The heating elements 19 are preferably explosion-protected to enable them to be used even in explosive environments, such as in the presence of combustible gases, mists, and/or vapors. The heating elements 19 may, for example, be encapsulated in a pressure-resistant manner and satisfy the requirements for an Ex-d marking.

In FIG. 1, a plurality of units, each of which comprises a heating element 19 and the group of fastening points 15 associated therewith, is provided in the housing 3. However, it is also possible to provide only a single heating element 19 which is provided below an associated group of fastening points 15.

In the embodiment shown, several units composed of a heating element 19 and the associated group of fastening points 15 are arranged one below the other in the housing 3. Several units composed of a heating element 19 and the associated group of fastening points 15 are also arranged horizontally side by side in the housing 3. The heating elements 19 and the electrical components 17 can thus be arranged particularly efficiently.

As FIG. 1 shows, a plurality of heating elements 19 can be arranged one after the other along their line extension direction. In comparison to a single, long heating element 19, this has the advantage that the heating elements 19 can be controlled independently of one another and different heating outputs can thus be set in a spatially resolved manner according to the situation.

In FIG. 1, a fastening rail 13 extending parallel to the heating element 19 is arranged above a heating element 19 extending horizontally in a line and provides the fastening points 15 associated with the heating element 19. In this way, the individual electrical components 17 can be heated particularly efficiently. It would however also be conceivable for two or more fastening rails 13 to be arranged above at least some heating elements 19. In FIG. 1, fastening rails 13 and heating elements 19 are arranged alternatingly with respect to a vertical direction. It would however also be conceivable for more than two fastening rails 13 to be arranged between two successive heating elements 19. If a plurality of associated fastening rails 13 is provided above a heating element 19, it is advantageous when the electrical components 17 for which the highest heating requirement is expected are mounted on the fastening rail 13 that is directly above the heating element 19.

In order to increase the achievable heating output, a further linear heating element 19, to which electric current can be applied, can be arranged above certain heating elements 19 and below the respective associated group of fastening points 15. This can be the case for each group of fastening points 15 or only a portion of the groups of fastening points 15 which requires particularly good heating. Such an arrangement of two heating elements 19 would substantially correspond to a single, wider heating element 19 but would have the advantage that either both or only one of the two heating elements 19 can optionally be operated as needed. It would also be sufficient to provide only one type of heating elements 19.

Figure 2A:
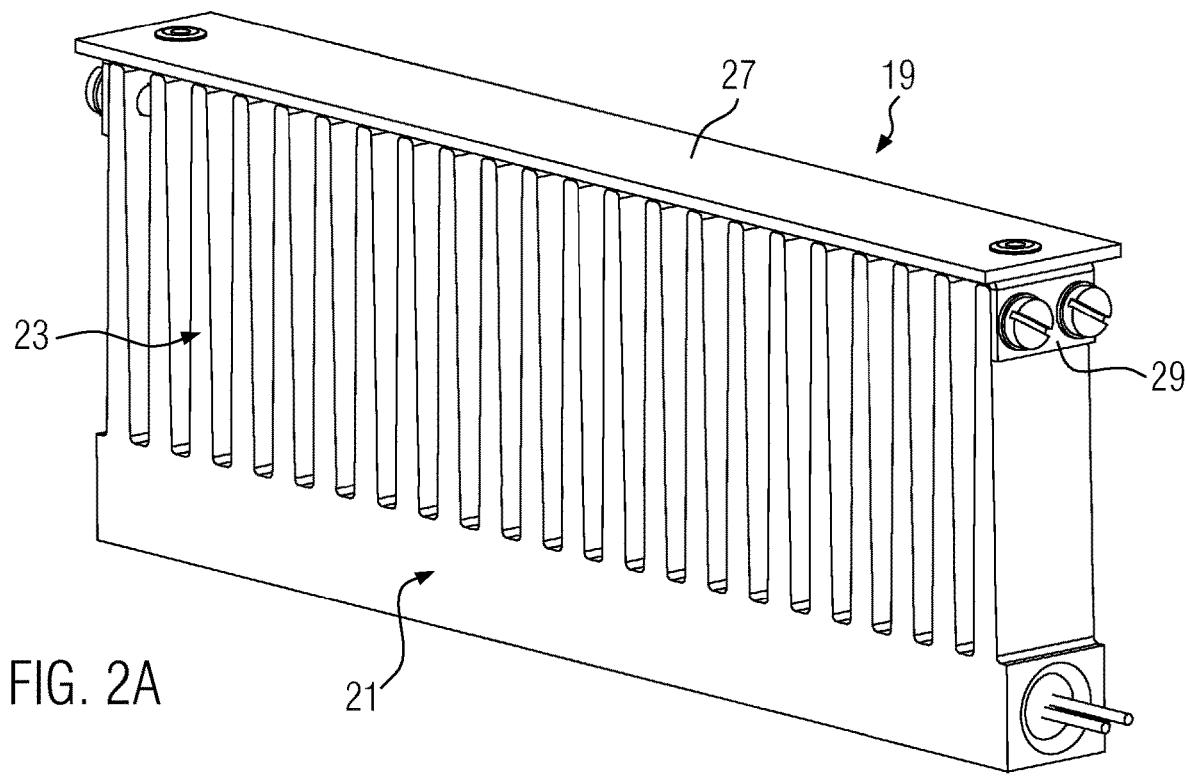
FIG. 2A a schematic representation of a linear heating element of an electrical distribution system according to one embodiment.

FIG. 2A illustrates a linear heating element 19 in more detail. For generating the heating output, the heating element 19 can in particular have within its main body 21 a resistance element to which electric current can be applied. A radiator body 23 is provided on the main body 21 in order to ensure efficient heat exchange with the atmosphere present in the housing 3. The heating elements 19 can, for example, be mounted on an interior of the rear wall 7 of the housing 3 with a surface of the main body 21 which is opposite the radiator body 23. For mounting the heating elements 19, the rear wall 7 of the housing 3 can have projections or recesses. The heating elements 19 are advantageously mounted on the housing 3 in such a way that they do not project from the rear wall 7 toward the front opening 11 of the housing 3 up to the position of the connection points 25 of the electrical components 17 for connecting the electrical components 17. The electrical components 17 can thus be electrically connected any problems even when heating elements 19 are pre-installed in the housing 3.

The heating element 19 shown in FIG. 2A comprises a particularly optional separating element 27 for physically separating one or more cables for connecting the electrical components 17 from the heating element 19 in order to avoid overheating of the cables. To this end, the separating element 27 extends along a line extension direction of the heating element 19. Preferably, the separating element 27 of a heating element 19 is thermally decoupled from the radiator body 23. As illustrated in FIG. 2A, the separating element 27 can for example be stood off from the radiator body 23 by means of a spacer 29 made in particular of plastic. In the variant shown, the separating element 27 is mounted on the radiator body 23. However, it would also be conceivable for the separating element 27 to be fastened to separate receptacles in the housing 3 in order to improve thermal decoupling.

Figure 2B:
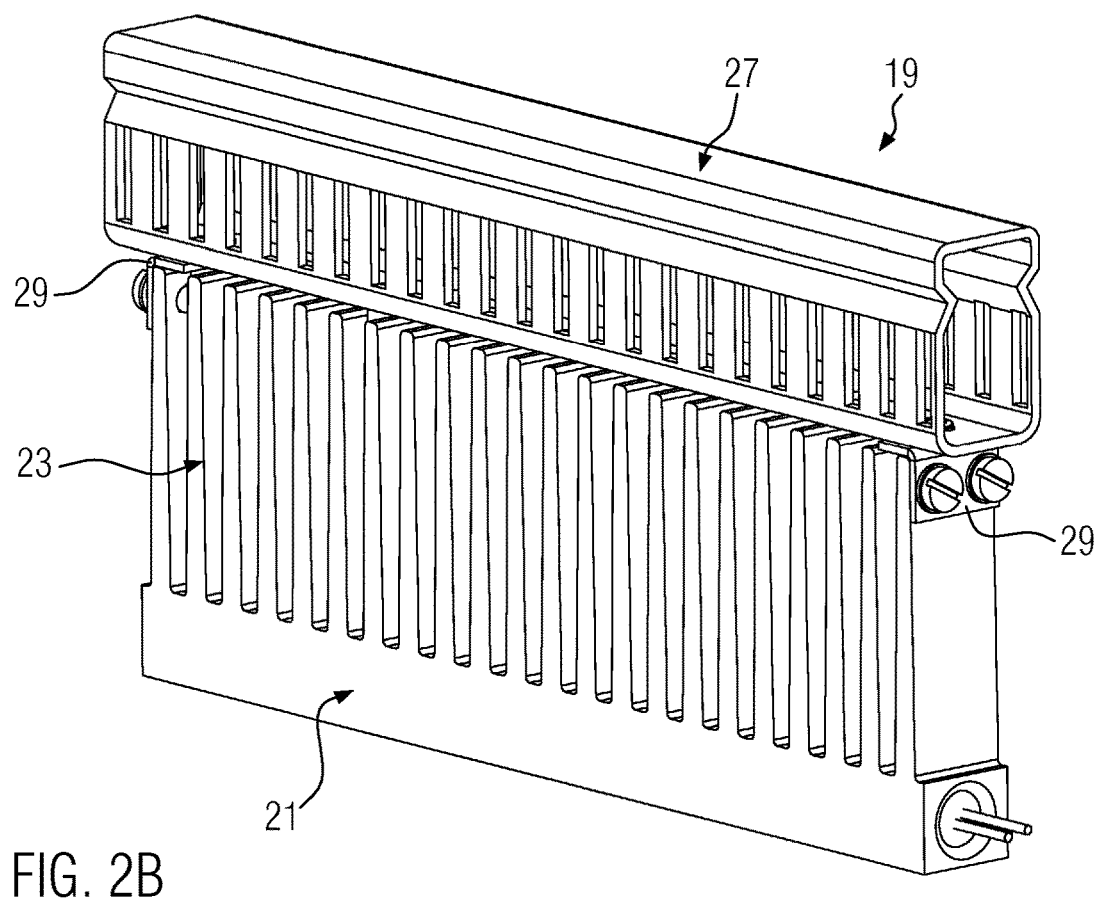
FIG. 2B a schematic representation of a further linear heating element of an electrical distribution system according to one embodiment.

FIG. 2B shows another embodiment of a linear heating element 19 in which the separating element 27 is designed as a cable duct for accommodating cables for connecting the electrical components 17. In the cable duct, the cables can be guided in a safe and protected manner to the electrical components 17. The cable duct preferably extends along the line extension direction of the corresponding heating element 19. Since the heating element 19 extends in a line below the fastening rails 13 carrying the electrical components 17, the electrical components 17 can thus be reached easily. The cable duct is preferably stood off from the radiator body 23, for example by means of a spacer 29. The spacer 29 may have a low thermal conductivity in order to prevent overheating of the cable duct as a result of direct contact with the radiator body 23. It would however also be conceivable for the cable duct to be provided directly in the radiator body 23 or fastened to separate receptacles in the housing 3.

The electrical distribution system 1 also comprises a busbar system 31 with busbars 33 for supplying the electrical components 17 with electric current. The electrical components 17 can be connected to the busbars 33 via cables which are preferably guided at least on a region to region basis in a cable duct of the heating elements 19. In the embodiment shown in FIG. 1, the busbar system 31 is provided in an upper region of the housing 3, which region lies above the region comprising the fastening rails 13 and the heating elements 19. In the embodiment shown, the region, which comprises the busbar system 31, of the housing 3 is thermally decoupled by means of a brush grommet 35 from the region, which comprises the fastening rails 13 and the heating elements 19, of the housing 3. The cables for connecting the busbars 33 to the electrical components 17 can be guided through the brush grommet 35, but the heat exchange between the decoupled regions is reduced. Thus, the heating output that is involved in unnecessarily heating the region, which comprises the busbar system 31, of the housing 3 is reduced.

In an alternative embodiment of an electrical distribution system 1 shown in FIG. 3, the busbar system 31 is provided in the housing 3 below the fastening rails 13 and the heating elements 19. Since the heat generated by the heating elements 19 inherently preferably diffuses upward, the busbar system 31 is heated less unnecessarily than if it were provided above the heating elements 19. The energy efficiency of the heating can thereby also be improved. Even if the region, which comprises the busbar system 31, of the housing 3 is provided below the region, which comprises the heating elements 19 and the fastening rails 13, of the housing 3, the two regions can be thermally decoupled by means of a brush grommet 35 or otherwise in order to further reduce the heat input to the busbar system 31. Alternatively, as shown in FIG. 3, it would also be conceivable to provide no thermal decoupling between the region which comprises the busbar system 31 and the region which comprises the fastening rails 13, of the housing 3, since heat generated during operation of the busbar system 31 can thus rise to the electrical components 17 and heat them.

Terminals 37 are provided for connecting the electrical distribution system 1 to an external power supply. The terminals 37 may be connected to the busbars 33 of the busbar system 31 in order to supply power thereto. In the embodiment shown in FIG. 1, the terminals 37 are provided in the housing 3 below the busbar system 31 and the electrical components 17 and the heating elements 19. As shown in FIG. 3, it would however also be conceivable to provide the terminals 37 in the housing 3 between the busbar system 31 and the fastening rails 13.

Alternative positionings of the terminals 37 are also conceivable. In order to illustrate this, FIG. 4 shows a schematic sectional view along line A-A through the electrical distribution system shown in FIG. 3. The position of the terminals 37 shown in FIG. 3 is marked by a solid line. It would however also be conceivable, as shown in FIG. 4 by dashed lines, to provide the terminals 37 in the housing 3 above the fastening rails 13 and above the busbar system 31. To this end, the housing 3 could be expanded upwardly by a further module, for example. It would also be conceivable to arrange the terminals 37 between the rear wall 7 of the housing 3 and the busbars 33 of the busbar system 31. This too is shown in FIG. 4 by dashes. The terminals 37 may in each case be arranged in a plane which extends on a region to region basis between a rear wall 7 of the housing 3 and the busbars 33 and is parallel to the rear wall 7 of the housing 3.

Figure 3:
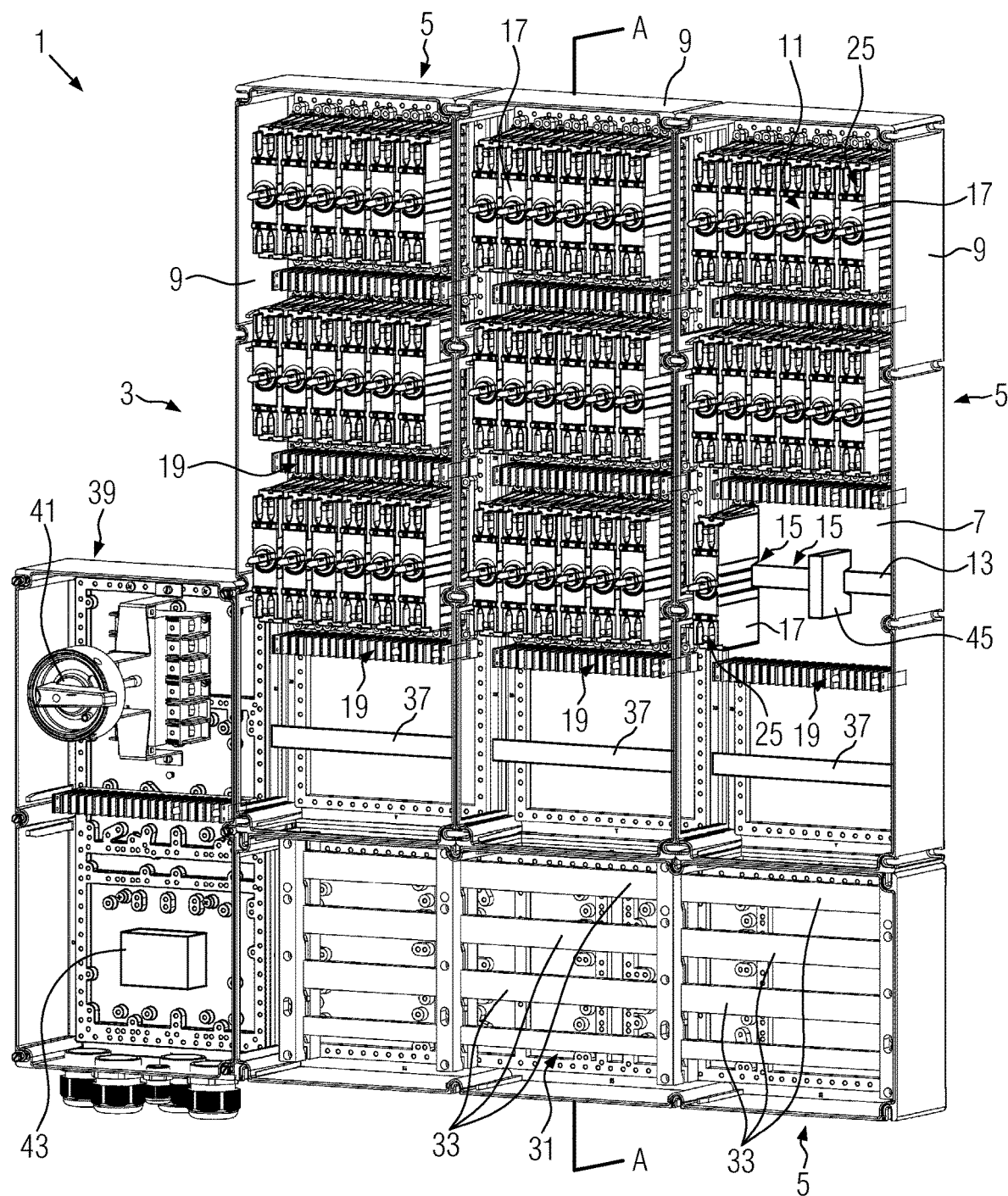
FIG. 3 a schematic representation of an electrical distribution system with electrical components mounted therein, according to one embodiment.
Figure 4:
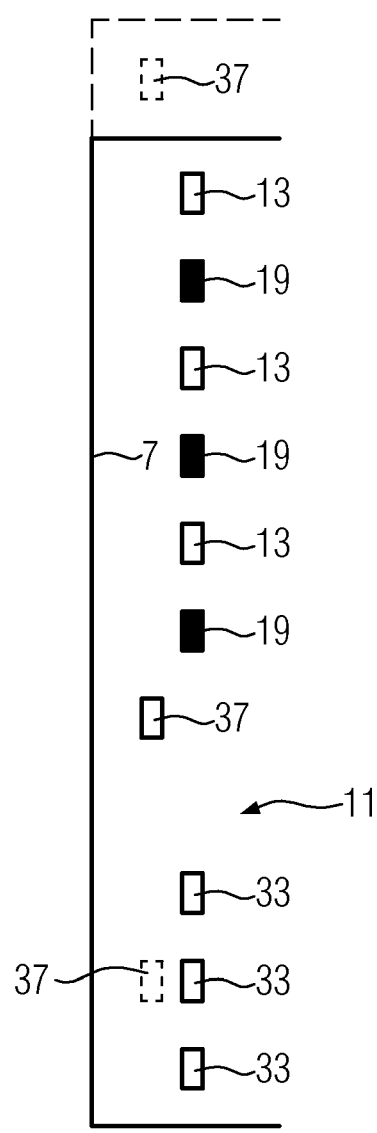
FIG. 4 a schematic sectional view through an electrical distribution system according to one embodiment, in particular for illustration of different possible arrangement positions of terminals.

The electrical distribution systems 1 shown in FIGS. 1 and 3 comprise a main switch housing 39 which is provided next to the busbar system 31 and in which a main switch 41 for activating or deactivating the current supply for the electrical distribution system 1 is provided.

The power supply for the heating elements 19 can be controlled and/or regulated by a control device 43. The control device 43 may be arranged in the housing 3 or externally. Advantageously, the control device 43 is supplied with measured temperature values from the interior of the housing 3 so that electric current can be applied to the heating elements 19 in accordance with the situation. In the embodiments shown in FIGS. 1 and 3, a temperature-measuring device 45 instead of an electrical component 17 is in each case provided at a fastening point 15. This temperature-measuring device is preferably provided at the fastening point 15 at which the lowest temperature is expected from time to time during operation of the electrical distribution system 1. The presence of a too low operating temperature can thus be early detected. The control device 43 may be configured by means of a switching device to automatically interrupt the power supply of the electrical components 17 when a temperature prevailing in the interior space of the housing 3 is less than a predetermined operating temperature. To this end, the power supply of the busbar system 31 may be interrupted, for example. It would also be conceivable to interrupt only the power supply of those individual electrical components 17 which are particularly temperature-sensitive. The control device 43 can also be designed to already prevent activation of the power supply of one, several or all electrical components 17 by means of a switching device before the predetermined operating temperature is reached. Activation of the power supply of the busbar system 31 before the predetermined operating temperature is reached can be prevented.

It would be conceivable to supply electric current to the heating elements 19 as well as the electrical components 17 via the busbars 33. However, it can also be advantageous if electric current can also be applied to the heating elements 19 when the electrical components 17 and/or the busbars 33 are not supplied with electric current. To this end, the heating elements 19 can, for example, have a separate power supply. In order to be able to adjust the heating output appropriately for the situation, the current supplied to the heating elements 19 may be adjustable by the control device 43. This can be achieved particularly easily by the control device 43 being able to switch between a first operating mode, in which the heating elements 19 are connected in series for the application of electric current, and a second operating mode, in which the heating elements 19 are connected in parallel to one another for the application of electric current.

The invention claimed is:

1. An electrical distribution system comprising: a housing; a fastening rail in the housing and including fastening points, arranged in a row for fastening electrical components; and one or more explosion-proof, linear heating elements in the housing, each heating element having a radiator body, wherein the one or more heating elements are arranged below the fastening points, wherein electric current can be applied to the heating elements in order to heat electrical components fastened at the fastening points on the fastening rail; wherein the fastening rail to which the electrical components are fastened is free of heating elements.

2. The electrical distribution system according to claim 1, further comprising a plurality of units, each unit comprising one or more explosion-proof linear heating elements and a group of fastening points mounted above the heating elements, the units being arranged one below the other in the housing and/or horizontally next to one another in the housing.

3. The electrical distribution system according to claim 1, wherein a first explosion-proof, linear heating element is arranged above a second explosion-proof, linear heating element and below the fastening points.

4. The electrical distribution system according to claim 2, wherein the plurality of units are arranged one above the other in a vertical direction.

5. The electrical distribution system according to claim 1, wherein at least two heating elements are arranged one after the other along their extension direction extending horizontally in the housing.

6. The electrical distribution system according to claim 1, wherein the one or more heating elements are provided on projections of a rear wall of the housing.

7. The electrical distribution system according to claim 1, further comprising a plurality of heating elements selectively configurable for connection in series in a first operating mode and in parallel in a second operating mode.

8. The electrical distribution system according to claim 1, further comprising a busbar system having busbars for supplying the electrical components with electric current.

9. The electrical distribution system according to claim 8, wherein a region, which comprises the busbar system, of the housing is thermally decoupled from a region, which comprises the fastening rails, of the housing, by a brush grommet.

10. The electrical distribution system according to claim 8, wherein the busbar system is provided in the housing below the fastening rails.

11. The electrical distribution system according to claim 8, further comprising terminals for connecting the distribution system to an external power supply for the electrical components, wherein said terminals are one of provided in the housing above the fastening rails and above the busbar system, and arranged in a plane which extends on a region to region basis between a rear wall of the housing and the busbars and is parallel to the rear wall of the housing, or arranged between the rear wall of the housing and the busbars.

12. The electrical distribution system according to claim 8, further comprising a main switch housing next to the busbar system, the main switch housing including a main switch.

13. The electrical distribution system according to claim 1, further comprising a temperature-measuring device instead of a corresponding electrical component at a fastening point at a location where the lowest temperature is expected during operation of the electrical distribution system.

14. The electrical distribution system according to claim 8, further comprising a switching device configured to automatically interrupt a power supply of the electrical components and/or of the busbar system when a temperature prevailing in the interior space, which comprises the fastening points, of the housing, is less than a predetermined operating temperature and/or is configured to prevent activation of the power supply of the electrical components and/or of the busbar system before the predetermined operating temperature is reached.

15. The electrical distribution system according to claim 8, further comprising a power supply for providing power to the one or more heating elements that is separate from a power supply for the electrical components, wherein electric current can be applied to the heating elements from the power supply providing power to the one or more heating elements, while the electrical components and/or the busbars are not supplied with electric current from the power supply for the electrical components.

16. The electrical distribution system according to claim 1, wherein at least a portion of the heating elements comprises a separating element for physically separating a cable from the heating element, which preferably extends along an extension direction of the heating element and is stood off from the radiator body to thermally decouple the separating element from the radiator body.

17. The electrical distribution system according to claim 16, wherein at least some of the separation elements are configured as cable ducts for accommodating one or more cables for connecting the electrical components.

18. The electrical distribution system according to claim 1, further comprising the electrical components, wherein the electrical components are fastened to the fastening points such that a distance of at least 0.3 cm, at least 0.5 cm, at least 0.7 cm, at least 1.0 cm, at least 1.5 cm or at least 2.0 cm is present between two adjacent electrical components at least on a region to region basis.

19. The electrical distribution system according to claim 1, further comprising the electrical components, each of which is configured to attach to a fastening rail at a connection point on the electrical component and extends along a projection direction of the fastening rail toward a front opening of the housing, wherein a front end of the heating elements with respect to the projection direction is behind the connection points of the electrical components for electrically connecting the electrical components with respect to the projection direction.

* * * * *